(12) United States Patent
Zhang

(10) Patent No.: US 8,612,142 B2
(45) Date of Patent: Dec. 17, 2013

(54) CUSTOMIZABLE EXERCISE ROUTES FOR A USER OF A PERSONAL NAVIGATION DEVICE

(75) Inventor: Rui Zhang, Auckland (NZ)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 490 days.

(21) Appl. No.: 12/909,845

(22) Filed: Oct. 22, 2010

(65) Prior Publication Data

US 2012/0101717 A1  Apr. 26, 2012

(51) Int. Cl.
*G01C 21/00* (2006.01)

(52) U.S. Cl.
USPC ............................................ 701/433; 701/425

(58) Field of Classification Search
USPC ......... 701/411, 412, 414, 425, 428, 433, 435, 701/439, 448, 491, 527, 541
See application file for complete search history.

(56) References Cited

U.S. PATENT DOCUMENTS

| | | | |
|---|---|---|---|
| 7,305,303 B2 * | 12/2007 | Soehren et al. | 701/472 |
| 7,480,512 B2 * | 1/2009 | Graham et al. | 455/456.3 |
| 8,364,389 B2 * | 1/2013 | Dorogusker et al. | 701/300 |
| 2008/0109158 A1 * | 5/2008 | Huhtala et al. | 701/208 |
| 2009/0187339 A1 * | 7/2009 | DeVries et al. | 701/208 |
| 2009/0209393 A1 * | 8/2009 | Crater et al. | 482/9 |
| 2010/0056340 A1 * | 3/2010 | Ellis et al. | 482/4 |
| 2010/0131184 A1 * | 5/2010 | Stanton | 701/200 |
| 2010/0198453 A1 * | 8/2010 | Dorogusker et al. | 701/33 |
| 2010/0216601 A1 * | 8/2010 | Saalasti et al. | 482/8 |
| 2011/0263331 A1 * | 10/2011 | Koski et al. | 463/40 |
| 2012/0035021 A1 * | 2/2012 | Saalasti et al. | 482/9 |
| 2012/0101723 A1 * | 4/2012 | Kendall et al. | 701/433 |
| 2012/0143497 A1 * | 6/2012 | Van Hende | 701/432 |
| 2012/0185164 A1 * | 7/2012 | McCoy et al. | 701/423 |

* cited by examiner

*Primary Examiner* — Jason Holloway

(74) *Attorney, Agent, or Firm* — Winston Hsu; Scott Margo

(57) ABSTRACT

A method of creating a customizable exercise route for a user of a personal navigation device is disclosed. The method includes receiving a selection of terrain type or difficulty level from the user, receiving a selection of a length of an exercise route to be generated, generating an exercise route for the user according to a current position of the personal navigation device, the selected terrain type or difficulty level, and the selected length of the exercise route, and providing routing instructions for the user to follow the generated exercise route.

15 Claims, 5 Drawing Sheets

Terrain preferences

☐ Walking
☐ Off-road cycling
☐ Road cycling
☐ Wheelchair accessible

FIG. 3

Detailed terrain preferences

☐ Hilly
☐ Flat
☐ Urban
☐ Green belt / natural
☐ Stairs
☐ Beach
☐ Nearby parking
☐ Difficulty

FIG. 4

CUSTOMIZABLE EXERCISE ROUTES FOR A USER OF A PERSONAL NAVIGATION DEVICE

BACKGROUND OF THE INVENTION

1. Field of the Invention

The invention relates to a personal navigation device, and more particularly, to a personal navigation device that creates customizable exercise routes for users based on the user's selection of terrain type and length of route, as well as the current location of the personal navigation device.

2. Description of the Prior Art

Global Positioning System (GPS) based navigation devices are well known and are widely employed as in-car navigation devices. Common functions of a navigation device include providing a map database for generating routing instructions that are then shown on a display of the navigation device. These navigation devices are often mounted on or in the dashboard of a vehicle using a suction mount or other mounting means.

The term "navigation device" refers to a device that enables a user to navigate to a pre-defined destination. The device may have an internal system for receiving location data, such as a GPS receiver, or may merely be connectable to a receiver that can receive location data. The device may compute a route itself, or communicate with a remote server that computes the route and provides navigation information to the device, or a hybrid device in which the device itself and a remote server both play a role in the route computation process. Portable GPS navigation devices are not permanently integrated into a vehicle but instead are devices that can readily be mounted in or otherwise used inside a vehicle. Generally (but not necessarily), they are fully self-contained—i.e. include an internal GPS antenna, navigation software and maps and can hence plot and display a route to be taken.

As use of personal navigation devices becomes more widespread, pedestrians often carry personal navigation devices with them as they walk or exercise in the city or when they go hiking in the wilderness. The personal navigation device can provide routing instructions to the user if the user enters a destination location into the personal navigation device. Otherwise, if no set destination is entered, the personal navigation device can track the user's route for helping the user find his way back to the original starting point.

Unfortunately, the personal navigation device is unable to provide suggestions on nearby exercise routes for the user to follow, and the job of determining a suitable exercise route is largely left up to the user. Much effort may be required by the user to find a suitable exercise route that has the proper terrain required by the user and that is of a proper length.

SUMMARY OF THE INVENTION

It is therefore one of the primary objectives of the claimed invention to provide a method of creating customizable exercise routes with a personal navigation device for allowing users to find nearby exercise routes according to a user's preferences of route terrain and route length.

According to an exemplary embodiment of the claimed invention, a method of creating a customizable exercise route for a user of a personal navigation device is disclosed. The method includes receiving a selection of terrain type or difficulty level from the user, receiving a selection of a length of an exercise route to be generated, generating an exercise route for the user according to a current position of the personal navigation device, the selected terrain type or difficulty level, and the selected length of the exercise route, and providing routing instructions for the user to follow the generated exercise route.

It is an advantage that users can create customizable exercise routes according to the user's preferred terrain type or difficulty level and preferred route length. The personal navigation device will then search through map and terrain databases to generate an exercise route that conforms to the user's preferences, and can provide routing instructions for the user to follow the generated exercise route.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 shows terrain preferences that may be selected by the user of the personal navigation device.

FIG. 4 shows detailed terrain preferences that maybe selected by the user of the personal navigation device.

DETAILED DESCRIPTION

Figure 1:
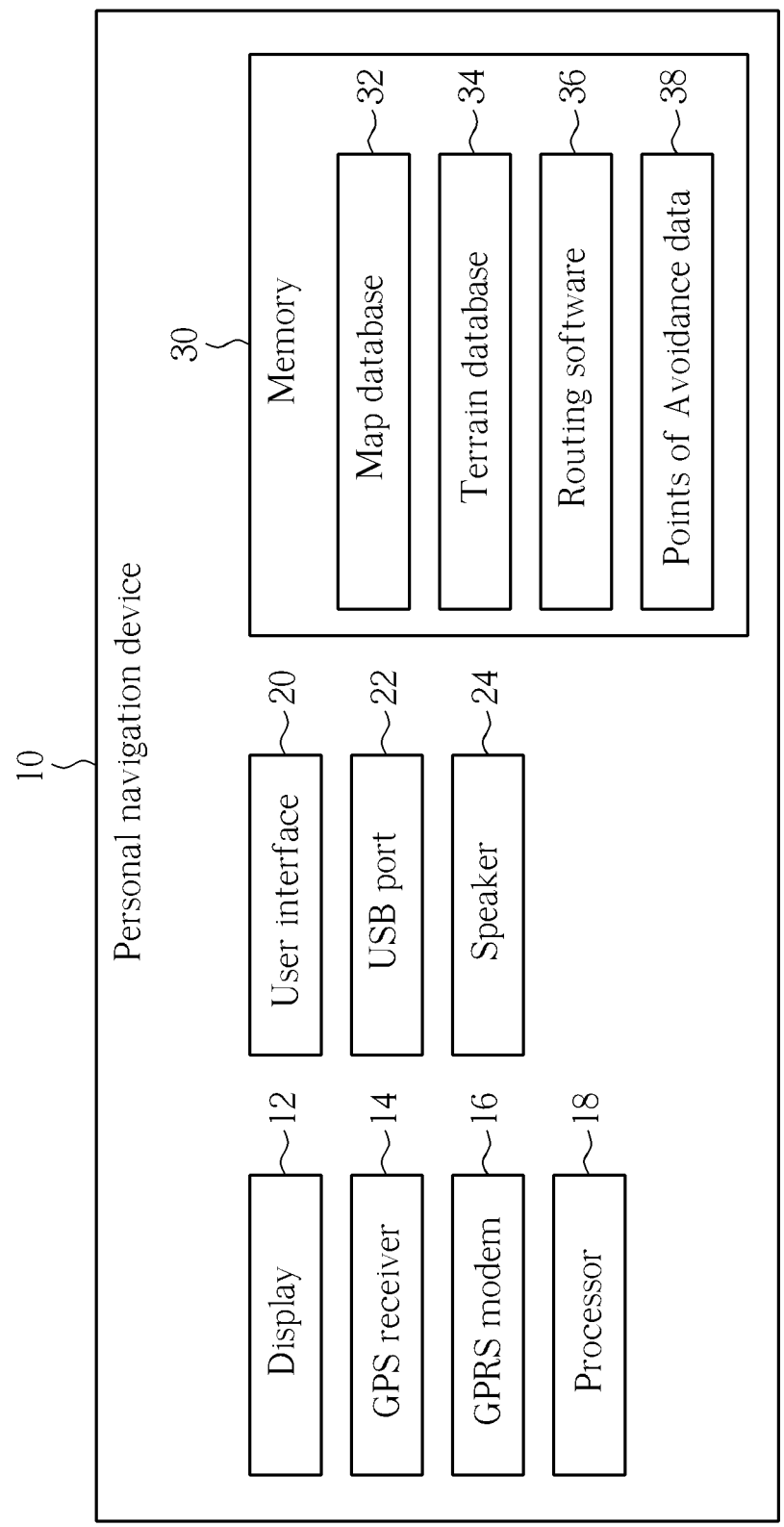
FIG. 1 is a block diagram of a personal navigation device according to the present invention.

Please refer to FIG. 1. FIG. 1 is a block diagram of a personal navigation device 10 according to the present invention. The personal navigation device 10 contains a display 12 which can be a touch sensitive display, a GPS receiver 14 for receiving the current coordinates of the personal navigation device 10, a General Packet Radio Service (GPRS) modem 16 for providing internet access, a processor 18 for controlling operation of the personal navigation device 10, a user interface 20, a Universal Serial Bus (USB) port 22 for allowing data to be exchanged with a computer, a speaker 24, and memory 30. The memory 30 is used to store a map database 32 containing map data and points of interest, a terrain database 34 containing terrain information of at least some of the areas covered by the map database 32, and routing software 36. The memory 30 also stores points of avoidance data 38 which contains areas that users may wish to avoid based on historical safety data of that area. The user of the personal navigation device 10 can download updated points of avoidance data 38 through the USB port 22 or through the GPRS modem 16.

Figure 2:
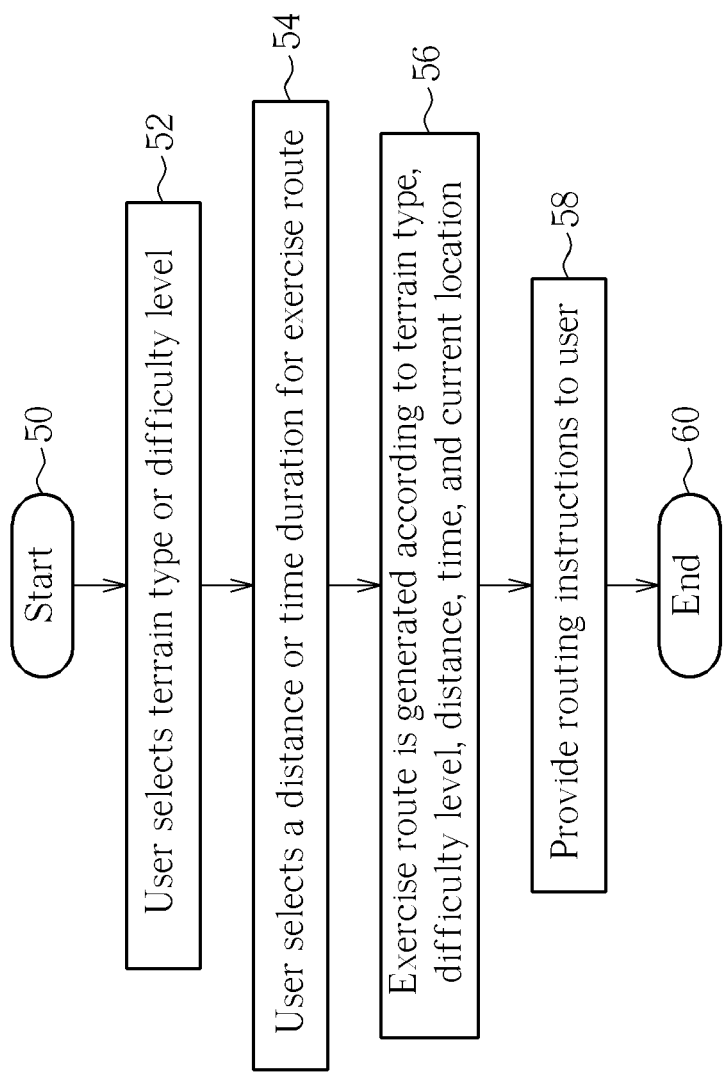
FIG. 2 is a flowchart illustrating a method of creating customizable exercise routes using the personal navigation device according to the present invention.

Please refer to FIG. 2. FIG. 2 is a flowchart illustrating a method of creating customizable exercise routes using the personal navigation device 10 according to the present invention. Steps contained in the flowchart will be explained below.

Step 50: Start.

Step 52: The user selects a terrain type or difficulty level for the exercise route. The user may specify the user's mode of transportation, such as walking, off-road cycling, road cycling, wheelchair, for selecting a route that is suitable for this activity. Other terrain options can also be specified, such as routes that have nearby parking, routes with hilly terrain, routes with flat terrain, routes in urban areas, routes in a green belt area or a natural area, routes that have a significant number of stairs, or routes along a beach. The user may also ask for routes to be generated according to a difficulty level of the route, according to a difficulty scale of 1 to 5.

Step 54 : The user indicates a length of the route to be generated. The length can be indicated in distance, or can be indicated in the amount of time that the user would like to exercise. If the user specifies a distance for the exercise route, the routing software 36 can search for an exercise route having a total distance approximately equal to the desired distance. If the user specifies an exercise time period, the routing software 36 can then use estimated speed information for the potential exercise routes in order to find an exercise route that would allow the user to exercise for the desired amount of time. The user may ask for a one-way route to be generated, which guides the user from point A to point B, or for a loop route to be generated which guides the user back to the original starting point at the end of the exercise route.

Step 56: The routing software 36 generates an exercise route according to the user's preferred terrain type or difficulty level and route length. The current position of the personal navigation device 10 given by the GPS receiver 14 is also consulted for locating an exercise route nearby the user's current position.

Step 58: The routing software 36 provides routing instructions to the user. Visual instructions can be given to the user through the display 12. Audio instructions can also be given through the speaker 24 or through an earphone jack. When users are cycling or walking, they may prefer to hear audio instructions instead of having to stop and glance down at the display 12, so preferably both audio and visual instructions are given to the user.

Step 60: End.

Please refer to FIG. 3. FIG. 3 shows terrain preferences that may be selected by the user of the personal navigation device 10. These are broad choices indicating the user's mode of transportation that can later be refined depending on the user's selection. The choices include walking routes, off-road cycling routes, road cycling routes, and wheelchair accessible routes.

After an initial choice is made, the user can be given further options. Suppose that the user selected the choice for "Walking" in FIG. 3. More detailed terrain options could then be presented to the user for allowing the user to select what kind of walking route is preferred. Please refer to FIG. 4. FIG. 4 shows detailed terrain preferences that may be selected by the user of the personal navigation device 10. These choices include routes with hilly terrain, routes with flat terrain, routes in urban areas, routes in a green belt area or a natural area, routes that have a significant number of stairs (measured as a total number of stairs along the route or as a number of stairs per unit distance), routes along a beach, or routes that have nearby parking. The user may also ask for routes to be generated according to a difficulty level of the route, such as on a difficulty scale of 1 to 5.

Figure 5:
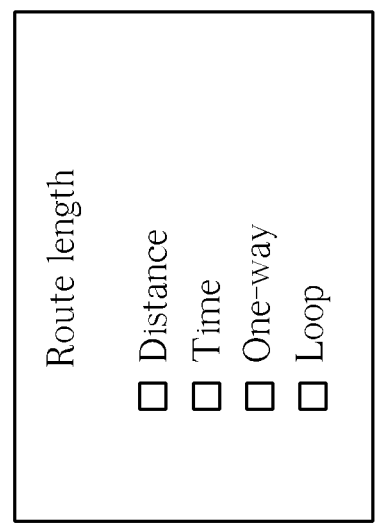
FIG. 5 shows route length preferences that may be selected by the user of the personal navigation device.

After the user has selected a terrain type or difficulty level, the user is given the chance to specify the length of the route and whether the route is a one-way route or a loop route. Please refer to FIG. 5. FIG. 5 shows route length preferences that may be selected by the user of the personal navigation device 10. As stated in the description of step 54 above, the route length can be indicated as a distance or a time. The user can also specify a one-way route from point A to point B or a loop route starting at point A and finishing at point A. When the user selects a loop route based on a distance selected by the user, the planned loop route might not fit the distance perfectly because the real route cannot be as accurate as an exercise machine. Therefore, the planning for the route preferably allows for a distance error (difference) between the selected distance and the actual distance that the routing software 36 generates. For example, the personal navigation device 10 could notify the user, "The loop route is 5 meters longer than your selection". The user could select "OK" if he accepts. Certainly, the error should be within a predetermined range.

After the user has selected a terrain type or difficulty level and a route length, the routing software 36 consults the map database 32 and the terrain database 34 for generating an exercise route conforming the user's selections. The generated exercise route may be chosen such that unsafe areas indicated in the points of avoidance data 38 are avoided. Otherwise, if the generated exercise route enters areas that are considered to be unsafe, the personal navigation device 10 can notify the user about these unsafe areas.

If the user decides that he likes the planned exercise route that the routing software 36 generated, the user can choose to save the planned exercise route as a favorite exercise route in the memory 30 of the personal navigation device 10. In this way, the user can conveniently revisit this exercise route in the future.

Another feature that the personal navigation device 10 can provide is creating an exercise route with planned stops to allow the user a chance to rest. The user can select the option of "plan a route with stops" when inputting selected parameters for the exercise route to be created. The user can even be offered the choice of selecting the number of stops to be included on the exercise route when the exercise route is planned for a long distance.

In summary, the present invention provides a way for users to create customizable exercise routes according to the user's preferred terrain type or difficulty level and preferred route length using a personal navigation device. The personal navigation device searches through map and terrain databases to generate an exercise route that conforms to the user's preferences, and provides routing instructions for the user to follow the generated exercise route.

Those skilled in the art will readily observe that numerous modifications and alterations of the device and method may be made while retaining the teachings of the invention.

What is claimed is:

1. A method of creating a customizable exercise route for a user of a personal navigation device, the method comprising:

receiving a selection of terrain type or difficulty level from the user;

receiving a selection of a length of an exercise route to be generated;

generating, by routing software executed by a processor of the personal navigation device, an exercise route for the user according to a current position of the personal navigation device, the selected terrain type or difficulty level, and the selected length of the exercise route, wherein the exercise route to be generated is a loop route, and when generating the loop route for a selected length that the user indicates with a specific length, the routing software generates the loop route having an actual distance within a predetermined distance of the specific length; and providing routing instructions for the user to follow the generated exercise route.

2. The method of claim 1, wherein the selected terrain type indicates terrain suitable for walking.

3. The method of claim 1, wherein the selected terrain type indicates terrain suitable for off-road cycling or road cycling.

4. The method of claim 1, wherein the selected terrain type indicates terrain that is wheelchair accessible.

5. The method of claim 1, wherein the selected terrain type indicates terrain with nearby parking.

6. The method of claim 1, wherein the selected terrain type indicates hilly terrain or flat terrain.

7. The method of claim 1, wherein the selected terrain type indicates terrain that is in urban, green belt, or natural areas.

8. The method of claim 1, wherein the selected terrain type indicates terrain that includes a predetermined number of stairs.

9. The method of claim 1, wherein the selected terrain type indicates beach terrain.

10. The method of claim 1, wherein the selected difficulty level is chosen according to a difficulty scale of 1 to 5.

11. The method of claim 1 further comprising notifying the user about unsafe areas along the generated exercise route.

12. The method of claim 1, wherein generating the exercise route comprises avoiding areas considered to be unsafe when generating the exercise route.

13. The method of claim 1, wherein providing routing instructions for the user to follow the generated exercise route comprises displaying routing instructions on a display of the personal navigation device or outputting audio routing instructions through the personal navigation device.

14. The method of claim 1 further comprising the user saving a favorite generated exercise route in memory for future reference.

15. The method of claim 1 further comprising:
   receiving a rest stop request from the user; and
   generating the exercise route for the user including one or more rest stops according to the selected length of the generated exercise route.

\* \* \* \* \*